Oct. 12, 1965
A. C. BECKWITH
3,211,818
EXTRUDER AND METHOD
Filed Feb. 20, 1962
2 Sheets-Sheet 1
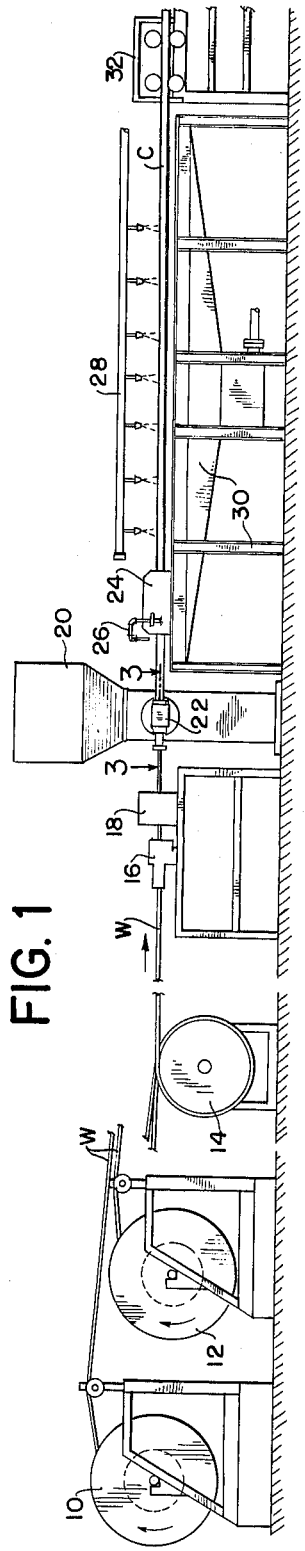
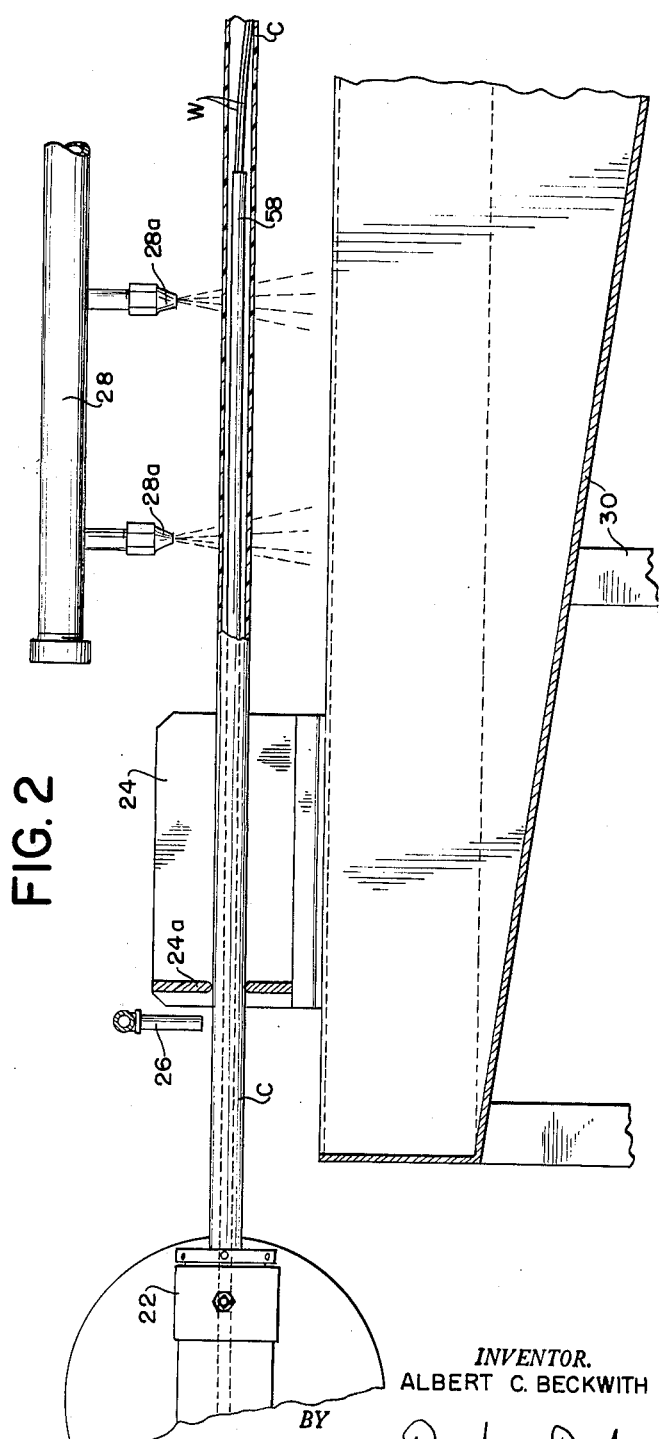
INVENTOR.
ALBERT C. BECKWITH
BY Darby & Darby
ATTORNEYS

INVENTOR.
ALBERT C. BECKWITH
BY
ATTORNEYS 3,211,818
EXTRUDER AND METHOD
Albert C. Beckwith, Vineland, N.J., assignor to Triangle Conduit & Cable Co., Inc., New Brunswick, N.J., a corporation of Delaware
Filed Feb. 20, 1962, Ser. No. 174,430
3 Claims. (Cl. 264—174)

This invention relates to a novel extruding machine and method by means of which a coilable duct and cable assembly can be manufactured in continuous lengths.

The cable and duct assembly produced by the machine and method of this disclosure comprises an outer tubular, usually of circular cross-section, semirigid plastic housing, sufficiently flexible to be readily formed into coils or spooled. Within the plastic housing are one or more conductors, as for example a single bare conductor and two separately insulated conductors to form a neutral three wire current distribution system useful for example in highway lighting. The plastic tubular housing is of substantially greater internal diameter than the outer conductor of the contained conductors, so that the conductors are individually removable for repair or replacement. In addition the housing is of such diameter that when load conditions require it an additional conductor or set of conductors may be pulled through the conduit to supplement the current carrying capacity of the assembly.

There are many practical and economical advantages of such an assembly but they have no specific relationship to the subject matter herein sought to be protected, and further reference thereto will not be made.

In passing it is to be noted that, as will appear more fully hereinafter, the subject matter herein claimed is not necessarily limited to an assembly in which the strands within the tubular housing are necessarily electrical conductors.

An important object of the invention is to provide a machine and a method by means of which one or more strands can be advanced, preferably at a constant speed, in the direction of their length and a semi-rigid, plastic, insulating and water impervious housing, is simultaneously extruded therearound at the same linear speed to form the final assembly.

An important object of this invention is to provide in a machine so operating, means for holding the strands out of contact with the freshly extruded tubular housing until it has become sufficiently form sustaining, as for example by cooling, so as not to be forced out of shape or damaged when the strands are allowed to come in contact therewith.

Still another object of the invention is to provide a novel method such as inferred above for producing a combined conduit and strand or cable assembly.

Other and more detailed objects of the invention will be apparent from the following description set out in detail in connection with the accompanying drawings.

In the drawings,

FIGURE 1 is a diagrammatic illustration of the mechanism of this invention as seen from one side;

FIGURE 2 is an enlarged elevational view partly in cross-section of the conduit forming, sizing and setting part of the machine;

Figure 3:
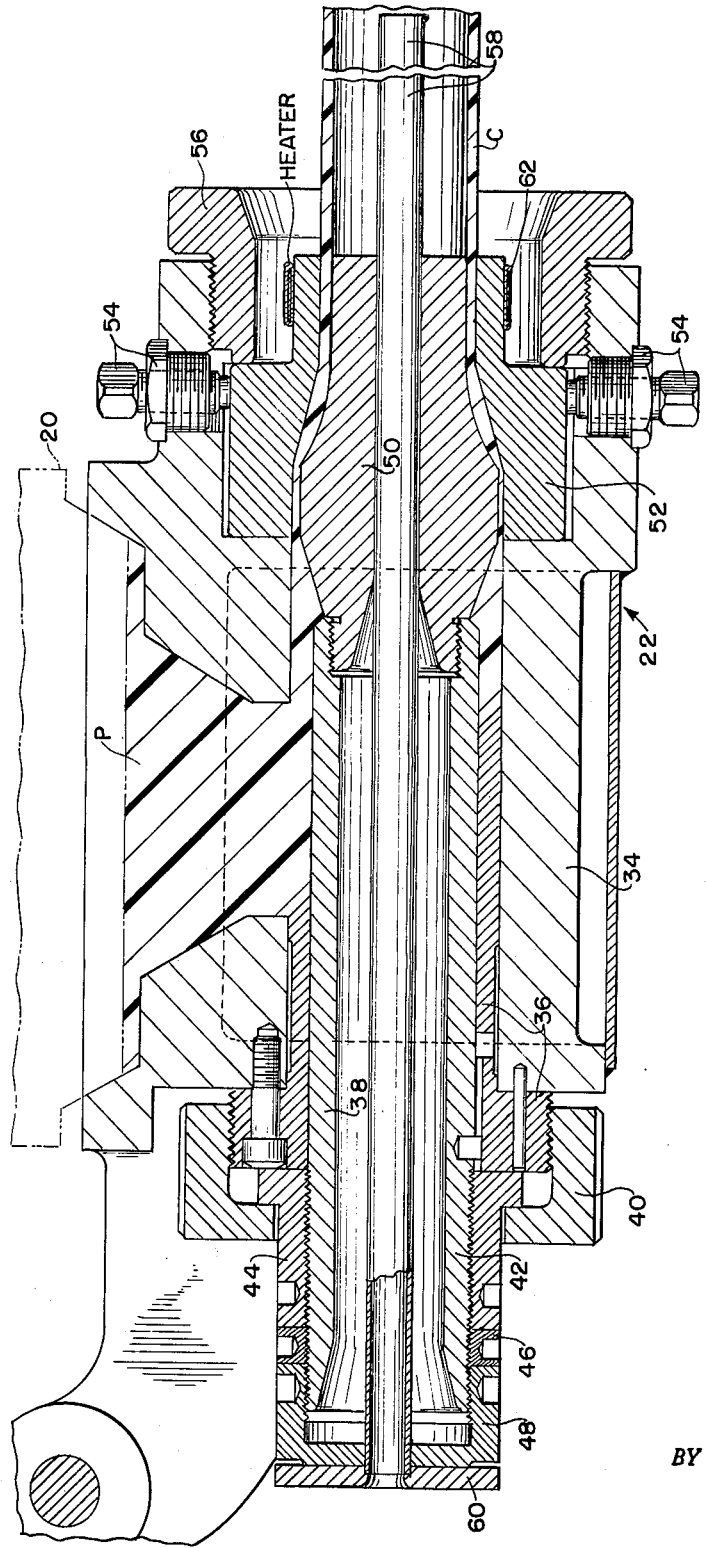
FIGURE 3 is an enlarged vertical, central and longitudinal cross-sectional view through the extruder head assembly of this invention.

In order to obtain the objects of this invention the machine and method herein disclosed involve the use of suitable plastic compositions which are usually worked at elevated temperatures so that such compositions may be continuously extruded in the form of a tube which commonly, but not necessarily, is of circular cross-section.

As those skilled in this art will understand, there are many compositions suited to this purpose, which are plastic or workable at temperature conditions in each case peculiar to the composition used, and which may therefore be extruded. Likewise, after extrusion to the desired form these compositions are commonly cooled to set or rigidify them so as to make them form sustaining. In accordance with this invention the plastic compositions are selected so that in the finished product the conduit or tubular casing will be sufficiently form sustaining and resilient so as not to be damaged by normal pressures applied thereto even if deformed somewhat, and further capable of returning to substantially original configuration when the pressure is relieved.

Since such plastic compositions for a period of time after they are extruded are relatively plastic, soft and non-form sustaining, it is necessary to protect them against contact with the strands or cables contained therein until they have rigidified. This is accomplished by the machine and method of this invention.

Referring to FIG. 1, there is shown at 10 and 12 rotatably supported spools or drums on which the strands or wires to be encased are coiled. In the case illustrated two such strands are shown, but in accordance with this invention one or more may be provided for.

The strand or strands W are passed around an idler capstan 14 which acts to feed them from the spools 10 and 12. From there they pass through any suitable form of straightening device 16 and then through a counter 18. From there the wires pass through the extruder head 22 on an extrusion machine 20. As the wires W issue from the extruder head 22 they are surrounded by a continuous molded plastic pipe C, which it is the function of the head 22 to form around the strands.

The extruded tube and the wires W moving coincidentally through a cooling zone which is illustrated as comprising a manifold 28 having a plurality of coolant sprayheads 28 mounted thereon so as to spray a coolant such as water onto the surface of the hot conduit C. The spray water is collected in a tank 30 positioned under the path of travel of the conduit and drained off to waste or reuse. At 32 is a power driven capstan assembly comprising driving rollers of suitable configuration to engage the surface of the coiled conduit C and feed or pull it along to take-up spools for coiling mechanism, not shown.

Since extrudible materials of the types which would be used for this purpose expand slightly as they issue from the extruder head, they are passed through a sizing plate 24a mounted in the framework 24. The conduit C is under tension from the extruder head to the power driven capstan 32 and so it is pulled down or stretched a slight amount in passing through the sizing plate 24a so as to be sized to a predetermined external diameter. It is preferable that a small amount of lubricant be applied to the surface of the conduit C adjacent its point of entry into the sizing plate 24a and for this purpose a supply of lubricant in fixture 26 is provided. As is well known in the art, water is a suitable lubricant for this purpose.

The details of a suitable extruder head 22 in accordance with this invention are illustrated in FIG. 3. The extruder head comprises a casing 34 secured in any suitable manner to the extrusion machine 20 which supplies the proper hot mix of plastic material P thereto. A headed sleeve 36 is attached in the lefthand end of a passage through the housing 34 by means of machine screws 38. The head of this sleeve is threaded, and secured to the end of the sleeve by means of a nut 40 is an extension 44 which is internally threaded, as shown. Mounted in the extension sleeve 44 by means of external threads is a tube 42 which is locked in place by means of a lock ring 46. Threaded over the end of the tube 42 is a cap 48 which supports in any suitable manner a plate 60 to which is welded a tubular mandrel 58.

The inner end of the tube 42 is threaded and has secured thereto by external threads a head 50 which has an axial passage to receive the tube 58, as shown. The right-hand terminal end of the head 50 has a cylindrical surface which cooperates with a ring 52 mounted in axial alignment with the tube 58. The internal passage at the righthand end of the ring 52 is of circular cross-section and of a radius greater than the radius of the cylindrical end of the head 50 to provide an annular channel of such dimensions as will form the conduit C with a predetermined wall thickness. The ring 52 can be radially adjusted by means of the set screws 54 so that it can be accurately aligned with the cylindrical surface of the head 50. This of course is to insure uniform wall thickness for the conduit at all circumferential points. The ring 52 is further locked in position against the seat in the housing 34 by means of a threaded lock ring 56. The terminal end of the head 50 in the annular die area can be heated with any suitable form of heating device 62.

The annular die area is of course in communication with the chamber in the casing 34 formed by these parts thus assembled so that the plastic composition P can be forced under pressure from the extruder 20 in a continuous stream around the head and into the annular die area previously described.

This extruder head is generally of well known construction and can take many detailed forms, as is well known in the art, with the exception of the provision of the tube 58 which extends from the supporting plate 60 to a point considerably beyond the area of extrusion of the plastic compound. This point is well illustrated in FIG. 2 where the tube 58 is shown extending out into the sprayhead area and may be of the order of five to ten feet long, depending upon the cooling and setting characteristics of the plastic composition.

As is clear from FIG. 2, the function of the tube 58 is to support the strands W out of contact with the freshly formed conduit C until it has been sufficiently cooled by the sprayheads 28a so as to be in a substantially final form sustaining state. At this time the strands W, which in the case of heavy insulated electrical conductors can be permitted to move into contact with the interior surface of the conduit C without fear of distorting the conduit out of shape or damaging its wall.

From the above it will be seen that a novel method of forming a conduit and cable assembly is a part of this invention. The method consists of advancing the strands in the direction of their length at a desirable speed, that is number of feet per unit of time, simultaneously extruding a plastic compound in the form of a tubular housing about the path of travel of the strand, cooling or otherwise setting the tubular housing until it is form sustaining, and then freeing the strands to move into contact with the interior surface thereof. In a preferable form of this product the semi-rigid conduit C is nevertheless sufficiently flexible to permit the assembly to be either coiled up on drums or in coils for transportation, storage and insulation installation.

From the above description it will be apparent to those skilled in the art that the subject matter of this invention both from the aspects of the machine and the method is not necessarily limited to the examples detailed herein for illustrative purposes. It is preferred, therefore, that the scope of protection afforded by any patent which issues hereon shall be determined by the appended claims.

What is claimed is:

1. In the machine of the type described the combination comprising means for supplying a heated plastic composition under pressure, means connected thereto including an annular die for extruding the plastic composition to form a tubular casing, and a tube supported axially of said die means and extending a substantial distance beyond the exit of said die for supporting a strand advancing through said tube for contacting said conduit until it has cooled sufficiently to be firm.

2. A method of making a loose fitting conduit and cable assembly comprising moving a cable in an axial direction, extruding a plastic composition in the form of a duct of uniform cross-sectional shape surrounding said cable, supporting the cable out of contact with said duct until it hardens to form sustaining condition and then releasing said cable into contact with said conduit.

3. In the method of claim 2, wherein the plastic composition is heated for extrusion purposes, the additional step of cooling the duct after extrusion and prior to release of said cable.

References Cited by the Examiner
UNITED STATES PATENTS

| | | | |
|---|---|---|---|
| 2,291,670 | 8/42 | Wiley et al. | 18—59 |
| 2,708,176 | 5/55 | Rhodes | 18—59 |

ROBERT F. WHITE, *Primary Examiner.*

MORRIS LIEBMAN, ALEXANDER H. BRODMERKEL, *Examiners.*

UNITED STATES PATENT OFFICE
CERTIFICATE OF CORRECTION

Patent No. 3,211,818 October 12, 1965

Albert C. Beckwith

It is hereby certified that error appears in the above numbered patent requiring correction and that the said Letters Patent should read as corrected below.

Column 4, line 27, for "for" read -- from --.

Signed and sealed this 3rd day of May 1966.

(SEAL)
Attest:

ERNEST W. SWIDER
Attesting Officer

EDWARD J. BRENNER
Commissioner of Patents